United States Patent
Ha et al.

(10) Patent No.: US 7,233,374 B2
(45) Date of Patent: Jun. 19, 2007

(54) ARRAY SUBSTRATE FOR TRANSFLECTIVE LIQUID CRYSTAL DISPLAY DEVICE

(75) Inventors: Kyoung-Su Ha, Seoul (KR); Dong-Guk Kim, Gunpo-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/183,438

(22) Filed: Jun. 28, 2002

(65) Prior Publication Data
US 2003/0016322 A1   Jan. 23, 2003

(30) Foreign Application Priority Data
Jul. 18, 2001   (KR) .............................. 2001-42992

(51) Int. Cl.
*G02F 1/1343*   (2006.01)
(52) U.S. Cl. .................... 349/114; 349/138; 349/43
(58) Field of Classification Search ............... 349/43, 349/44, 110, 137, 113, 114, 37
See application file for complete search history.

(56) References Cited

U.S. PATENT DOCUMENTS

| | | | | |
|---|---|---|---|---|
| 5,789,761 | A * | 8/1998 | Ihara et al. ................ 257/59 |
| 5,796,448 | A * | 8/1998 | Kim ............................ 349/39 |
| 6,246,453 | B1 * | 6/2001 | Zhang et al. ................ 349/39 |
| 6,297,862 | B1 * | 10/2001 | Murade ....................... 349/44 |
| 6,320,636 | B2 * | 11/2001 | Zhang et al. ............... 349/139 |
| 6,384,886 | B2 * | 5/2002 | Yamazaki et al. ......... 349/113 |
| 6,429,917 | B1 * | 8/2002 | Okamoto et al. .......... 349/110 |
| 6,452,654 | B2 * | 9/2002 | Kubo et al. ................ 349/114 |
| 6,559,913 | B1 * | 5/2003 | Sera ........................... 349/111 |
| 6,624,864 | B1 * | 9/2003 | Kubo et al. ................ 349/139 |
| 6,630,977 | B1 * | 10/2003 | Yamazaki et al. .......... 349/141 |

* cited by examiner

*Primary Examiner*—Andrew Schechter
*Assistant Examiner*—Richard H Kim
(74) *Attorney, Agent, or Firm*—McKenna Long & Aldridge LLP

(57) ABSTRACT

An array substrate for a liquid crystal display device includes a substrate, a thin film transistor on the substrate wherein the thin film transistor includes a gate electrode, a source electrode and a drain electrode, and has a channel; a first passivation layer on the thin film transistor; a reflector on the first passivation layer, wherein the reflector covers the channel; a second passivation layer on the reflector; and a transparent electrode on the second passivation layer, wherein the transparent electrode contacts the thin film transistor, wherein the reflector has an opening over the drain electrode, the opening being spaced apart from the channel by a distance such that light incident onto the drain electrode is reflected at least twice at the drain electrode.

24 Claims, 13 Drawing Sheets

ARRAY SUBSTRATE FOR TRANSFLECTIVE LIQUID CRYSTAL DISPLAY DEVICE

This application claims the benefit of Korean Patent Application No. 2001-42992, filed on Jul. 18, 2001 in Korea, which is hereby incorporated by reference for all purposes as if fully set forth herein.

BACKGROUND OF THE INVENTION

1. Field of the Invention

The present invention relates to a liquid crystal display (LCD) device and more particularly, to an array substrate for a transflective liquid crystal display device.

2. Discussion of the Related Art

In general, the liquid crystal display (LCD) device includes two substrates, which are spaced apart and facing each other, and a liquid crystal layer interposed between the two substrates. Each of the substrates includes an electrode and the electrodes of each substrate are also facing each other. Voltage is applied to each electrode and an electric field is induced between the electrodes. An alignment of the liquid crystal molecules is changed by the varying intensity or direction of the electric field. The LCD device displays a picture by varying transmissivity of the light varying according to the arrangement of the liquid crystal molecules.

Because the liquid crystal display (LCD) device is not luminescent, it needs an additional light source in order to display images. The liquid crystal display device is categorized into a transmissive type and a reflective type depending on the kind of light source.

In the transmissive type, a back light behind a liquid crystal panel is used as a light source. Light incident from the back light penetrates the liquid crystal panel, and the amount of the transmitted light is controlled depending on the alignment of the liquid crystal molecules. Here, the substrates must be transparent and the electrodes of each substrate must also be formed of transparent conductive material. As the transmissive liquid crystal display (LCD) device uses the back light as a light source, it can display a bright image in dark surroundings. By the way, because an amount of the transmitted light is very small for the light incident from the back light, the brightness of the back light must be increased in order to increase the brightness of the LCD device. Consequently, the transmissive liquid crystal display (LCD) device has high power consumption due to the back light.

On the other hand, in the reflective type LCD device, sunlight or artificial light is used as a light source of the LCD device. The light incident from the outside is reflected at a reflective plate of the LCD device according to the arrangement of the liquid crystal molecules. Since there is no back light, the reflective type LCD device has much lower power consumption than the transmissive type LCD device. However, the reflective type LCD device cannot be used in dark places because it is depends on an external light source.

Therefore, a transflective LCD device, which can be used both in a transmissive mode and in a reflective mode, has been recently proposed. A conventional transflective LCD device will be described hereinafter more in detail.

FIG. 1 is an exploded perspective view illustrating a conventional transflective LCD device. The conventional transflective LCD device 11 has upper and lower substrates 15 and 1, which are spaced apart from and facing each other, and also has liquid crystal 23 interposed between the upper substrate 15 and the lower substrate 1. The liquid crystal 23 has positive or negative dielectric anisotropy.

A gate line 4 and a data line 16 are formed on the inner surface of the lower substrate 1. The gate line 4 and the date line 16 cross each other to define a pixel area "P". The pixel area "P" includes a transmissive region "A" and a reflective region "B". A thin film transistor "T" is situated at the crossing of the gate line 4 and the data line 16. A pixel electrode 30, which is connected to the thin film transistor "T", is formed in the pixel area "P".

Meanwhile, a black matrix 19, which has an opening corresponding to the pixel electrode 30, is formed on the inside of the upper substrate 15, and a color filter 17 corresponding to the opening of the black matrix 19 is formed on the black matrix 19. The color filter 17 is composed of three colors: red, green and blue. Each color corresponds to a pixel electrode 30. Subsequently, a transparent common electrode 13 is formed on the color filter 17.

In the conventional transflective LCD device of FIG. 1, when a voltage is applied to the pixel electrode 30 and the common electrode 13, an electric field is induced between the pixel electrode 30 and the common electrode 13 in a direction perpendicular to the upper and lower substrates 15 and 1. Molecules of the liquid crystal 23 are arranged by the electric field and light is emitted through the arranged liquid crystal 23 from a back light (not shown) disposed below the conventional transflective LCD device, so that images are displayed.

FIGS. 2 and 3 show an array substrate for a conventional liquid crystal display (LCD) device. FIG. 2 is a plan view of the array substrate for a conventional (LCD) device, and FIG. 3 is a cross-sectional view along the line III—III of FIG. 2.

In FIG. 2 and FIG. 3, a gate electrode 2 and a gate line 4 are formed on a substrate 1. The gate line 4 extends horizontally in the context of the figure and the gate electrode 2 is connected to the gate line 4. A gate insulator 6 covers the gate electrode 2 and the gate line 4, and an active layer 8 is formed on the gate insulator 6. An ohmic contact layer 10 of doped amorphous silicon is formed on the active layer 8.

Next, a source electrode 12 and a drain electrode 14 are formed on the ohmic contact layer 10. The source electrode 12 is connected to a data line 16, which extends vertically in the context of the figure and crosses the gate line 4 to define a pixel region "P". The ohmic contact layer 10 lowers contact resistance between the active layer 8 and the two electrodes 12 and 14. A capacitor electrode 17, which is made of the same material as the data line 16, is also formed on the gate insulator 6. The capacitor electrode 17 overlaps the gate line 4 to form a storage capacitor. A thin film transistor "T" includes the gate electrode 2, the source electrode 12 and the drain electrode 14. The active layer 8 exposed between the source electrode 12 and the drain electrode 14 becomes a channel "CH" of the thin film transistor "T" when carriers flow between the source electrode 12 and the drain electrode 14.

A first passivation layer 18 covers the source electrode 12, the drain electrode 14, the data line 16, and the capacitor electrode 17. The first passivation layer 18 has a first transmissive hole 20, which exposes a part of the substrate 1 through the gate insulator 6. The first transmissive hole 20 is to equalize the brightness of a transmissive mode with the brightness of a reflective mode. At this time, it is good that the first passivation layer 18 is made of a benzocyclobutene (BCB) or an acrylic resin. Next, a reflector 26 is formed on the first passivation layer 18. The reflector 26 has a first opening 26a and a second opening 26b over the drain electrode 14 and the capacitor electrode 17, respectively.

The reflector 26 also has a second transmissive hole 26c corresponding to the first transmissive hole 20. The reflector 26 is made of a metal that reflects light well such as aluminum (Al). A second passivation layer 28 is formed on the reflector 26. The second passivation layer 28 has a first contact hole 28a exposing the drain electrode 14 and a second contact hole 28b exposing the capacitor electrode 17 through the first passivation layer 18. The first contact hole 28a and the second contact hole 28b go through the first opening 26a and the second opening 26b, respectively. The second passivation layer 28 also has a third transmissive hole 28c corresponding to the first and second transmissive holes 20 and 26c. A transparent electrode 30 is formed on the second passivation layer 28. The transparent electrode 30 is located in the pixel region "P". The transparent electrode 30 is connected to the drain electrode 14 through the first contact hole 28a and connected to the capacitor electrode 17 through the second contact hole 28b. Here, the reflector 26 is disconnected from the transparent electrode 30 so no electric charges are created in the reflector 26.

When voltage is applied to the transparent electrode 30, liquid crystal molecules (not shown), which are situated on the transparent electrode 30, are arranged and light incident from sunlight or artificial light is reflected at the reflector 26 according to the arrangement of the liquid crystal molecules. Thus, images are displayed in a reflective mode. On the other hand, when voltage is applied to the transparent electrode 30, light incident from a back light (not shown), which may be placed below the substrate 1, penetrates the transparent electrode 30 and the liquid crystal (not shown) through the second transmissive hole 26c depending on the alignment of the liquid crystal molecules. Therefore, light is emitted and images are displayed in a transmissive mode.

By the way, in the transflective liquid crystal display (LCD) device, amorphous silicon is generally used as the active layer 8 of the thin film transistor "T" because it can be uniformly formed at a low temperature over a large area. However, the amorphous silicon is sensitive to visible light. That is, when light is absorbed into the active layer 8 of the thin film transistor "T", a leakage current caused by absorbed light flows in the thin film transistor "T". This leakage current causes an undesirable signal in the LCD device, so that the thin film transistor "T" cannot properly function as a switching element. Therefore, a black matrix (not shown), which shields the thin film transistor "T" from the light, is formed on a substrate (not shown) opposing the substrate 1 having the thin film transistor "T" facing the thin film transistor "T". However, it is difficult to completely shield the light with the black matrix because accurate arrangement of the black matrix and the thin film transistor "T" is not easy. If light is entirely shielded, the black matrix must have a larger size than the thin film transistor "T" if alignment margin is taken into consideration. Therefore, aperture ratio of the LCD device is reduced.

SUMMARY OF THE INVENTION

Accordingly, the present invention is directed to an array substrate for a transflective liquid crystal display device and a manufacturing method of the array substrate for a transflective liquid crystal display that substantially obviates one or more of problems due to limitations and disadvantages of the related art.

An advantage of the present invention is to provide an array substrate for a transflective liquid crystal display device that is used both in a transmissive mode and in a reflective mode and has no leakage current in a thin film transistor.

Another advantage of the present invention is to provide a method of manufacturing an array substrate for a transflective liquid crystal display device that has no leakage current in a thin film transistor.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device includes a substrate, a thin film transistor on the substrate wherein the thin film transistor includes a gate electrode, a source electrode and a drain electrode, and has a channel, a first passivation layer on the thin film transistor, a reflector on the first passivation layer, wherein the reflector covers the channel, a second passivation layer on the reflector, and a transparent electrode on the second passivation layer, wherein the transparent electrode contacts the thin film transistor, wherein the reflector has an opening over the drain electrode, the opening being spaced apart from the channel by a distance, thereby incident light onto the drain electrode being reflected at least twice at the drain electrode.

In another aspect of the present invention, a liquid crystal display device includes first and second substrates facing and spaced apart from each other, a thin film transistor on an inner surface of the first substrate, wherein the thin film transistor includes a gate electrode, a source electrode and a drain electrode, and has a channel, a first passivation layer on the thin film transistor, a reflector on the first passivation layer, wherein the reflector covers the channel, a second passivation layer on the reflector, a transparent electrode on the second passivation layer, wherein the transparent electrode contacts the thin film transistor, a color filter on an inner surface of the second substrate, a common electrode on the color filter, and a liquid crystal layer between the transparent electrode and the common electrode, wherein the reflector has an opening over the drain electrode, the opening being spaced apart from the channel by a distance, thereby light incident onto the drain electrode being reflected at least twice at the drain electrode.

In another aspect of the present invention, a liquid crystal display device includes first and second substrates facing and spaced apart from each other, a thin film transistor on an inner surface of the first substrate, wherein the thin film transistor includes a gate electrode, a source electrode and a drain electrode, and has a channel, a first passivation layer on the thin film transistor, a reflector on the first passivation layer, the reflector overlapping the drain electrode, a second passivation layer on the reflector, a transparent electrode on the second passivation layer, wherein the transparent electrode contacts the thin film transistor, a color filter on an inner surface of the second substrate, a black matrix on an inner surface of the second substrate, wherein the black matrix overlaps the thin film transistor, a common electrode on the color filter and the black matrix, and a liquid crystal layer between the transparent electrode and the common electrode, wherein the reflector has an opening over the drain electrode, the opening being spaced apart from the channel by a distance, thereby incident light onto the drain electrode being reflected at least twice at the drain electrode.

In another aspect of the present invention, a method of manufacturing an array substrate for a liquid crystal display device includes forming a gate line and a gate electrode on a substrate, forming a gate insulator on the gate line and the gate electrode, forming an active layer on the gate insulator, forming an ohmic contact layer on the active layer, forming a data line, a source electrode, and a drain electrode on the ohmic contact layer, forming a first passivation layer on the data line, the source electrode, and the drain electrode, forming a reflector on the first passivation layer, wherein the reflector covers the active layer and has an opening over the drain electrode, forming a second passivation layer on the reflector, and forming a transparent electrode on the second passivation layer, wherein the transparent electrode contacts the drain electrode, wherein the active layer between the source and drain electrodes becomes a channel of a thin film transistor, the channel being spaced apart from the opening by a distance, thereby light incident onto the drain electrode being reflected at least twice at the drain electrode.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 1:
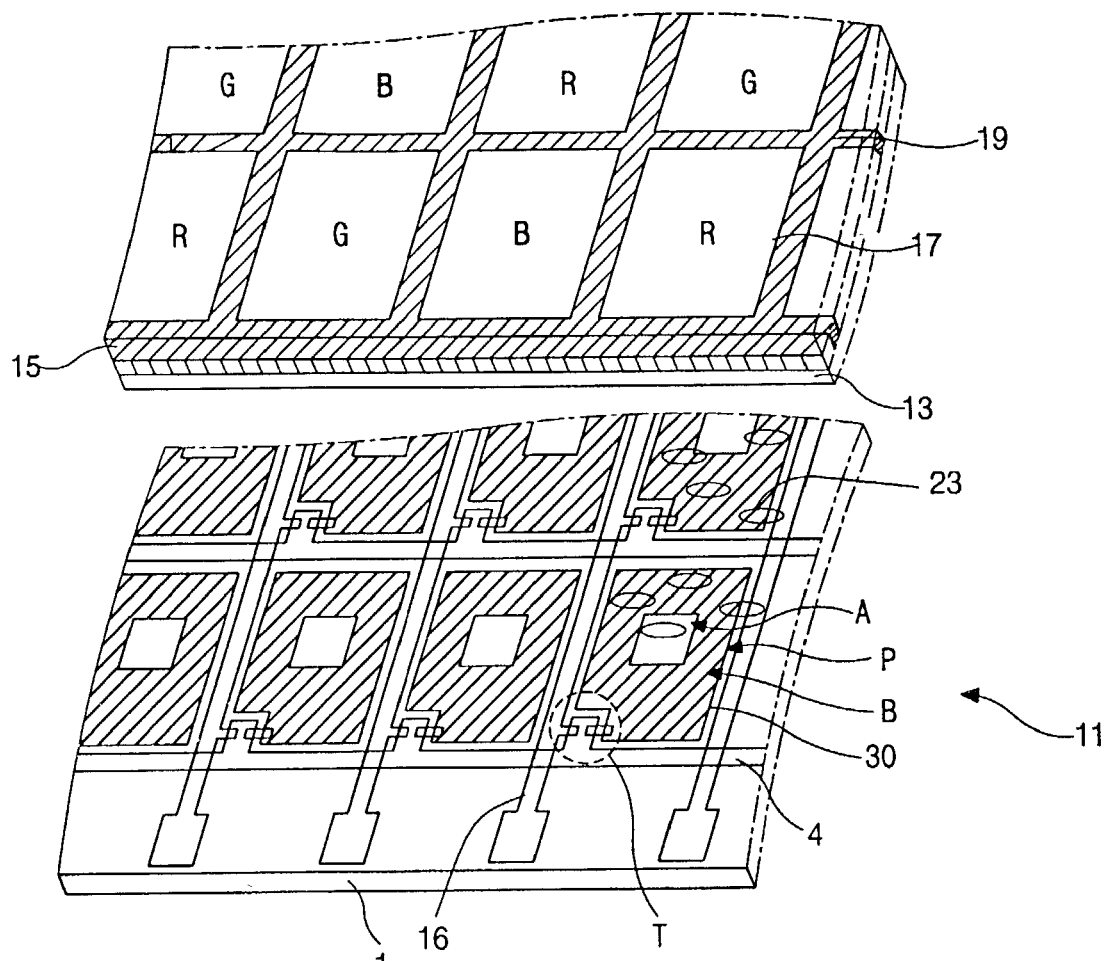
FIG. 1 is an exploded perspective view illustrating a conventional transflective liquid crystal display (LCD) device.
Figure 2:
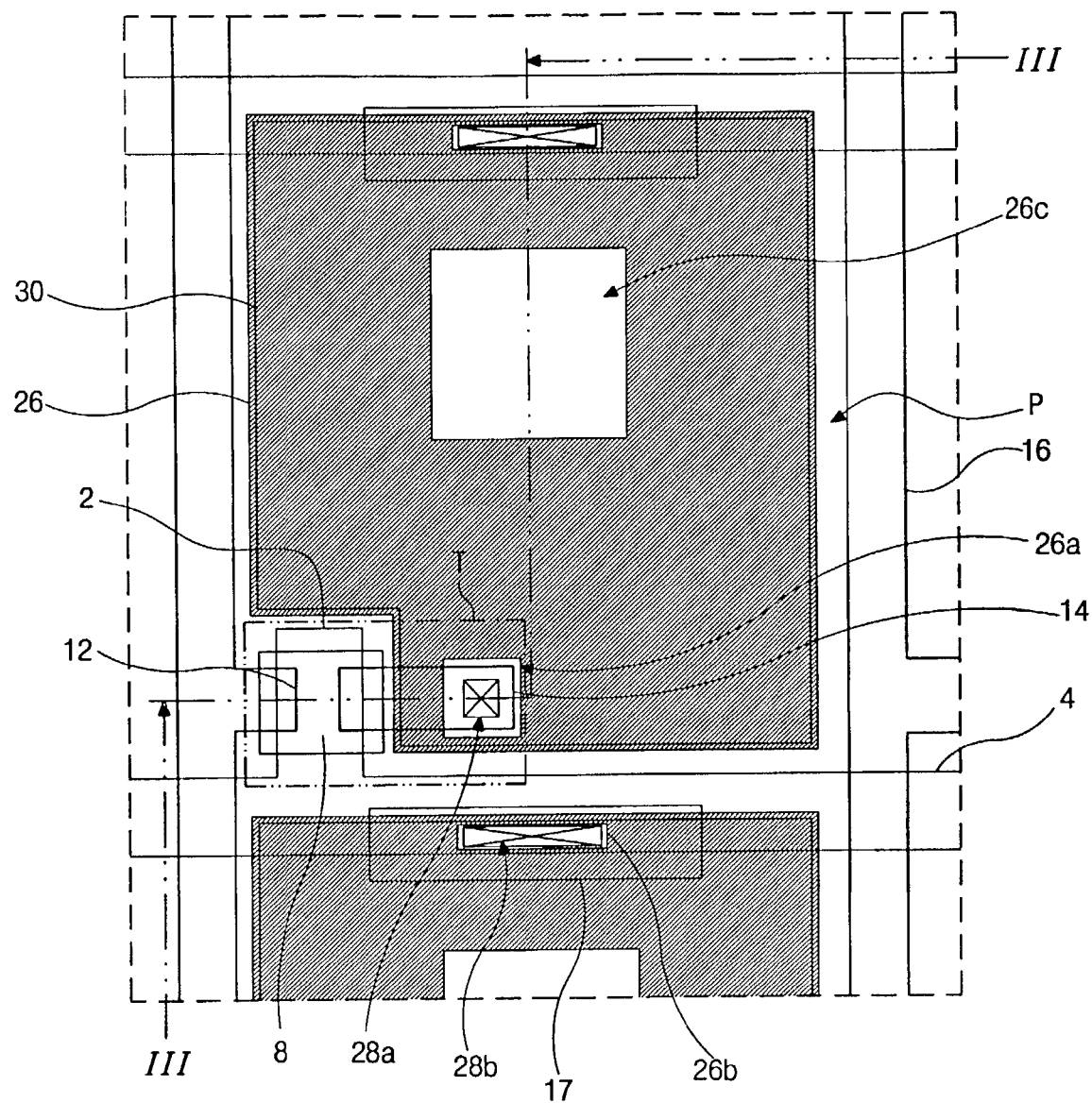
FIG. 2 is a plan view of an array substrate for a transflective liquid crystal display (LCD) device according to a related art.
Figure 3:
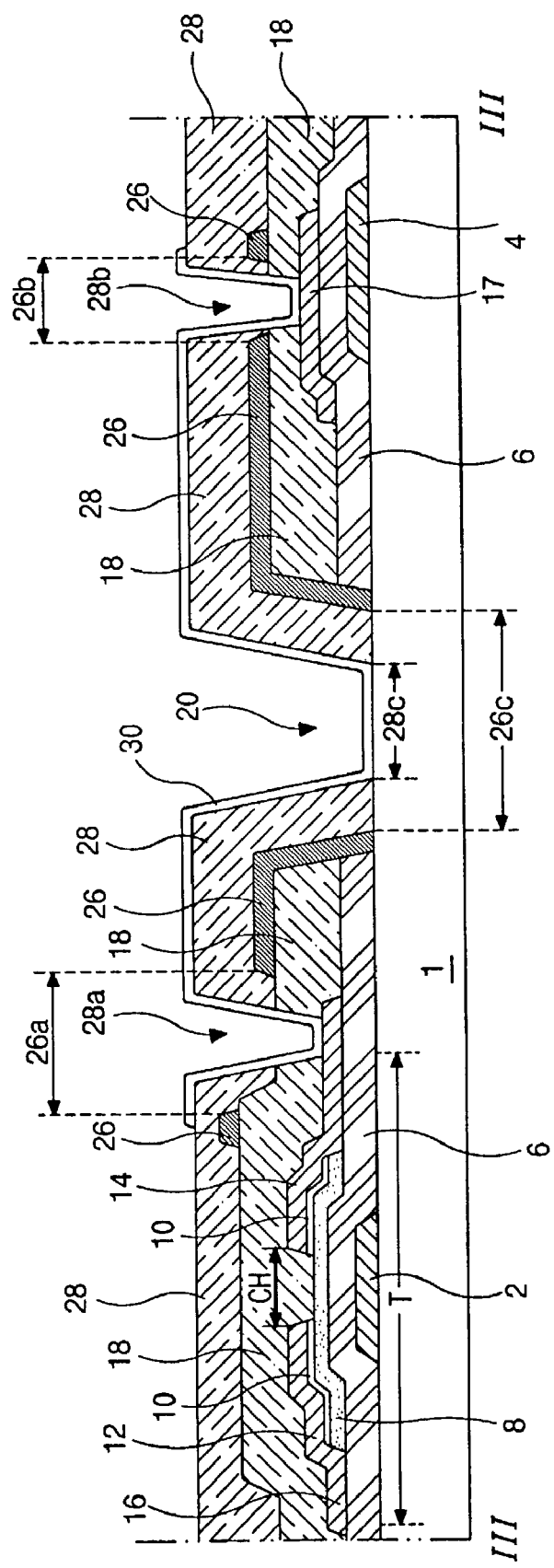
FIG. 3 is a cross-sectional view along the line III—III of FIG. 2.
Figure 4:
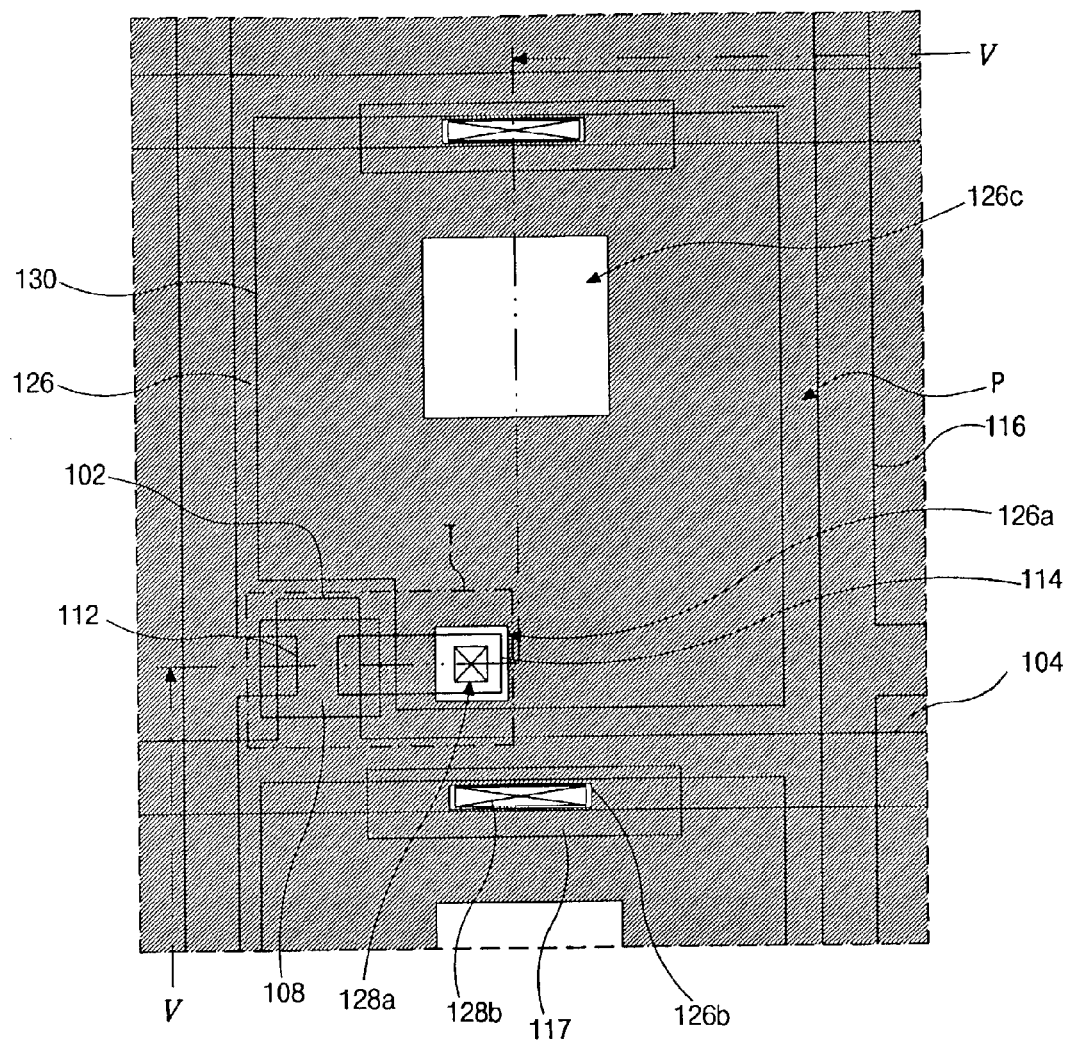
FIG. 4 is a plan view of an array substrate for a transflective liquid crystal display (LCD) device according to a first embodiment of the present invention.
Figure 5:
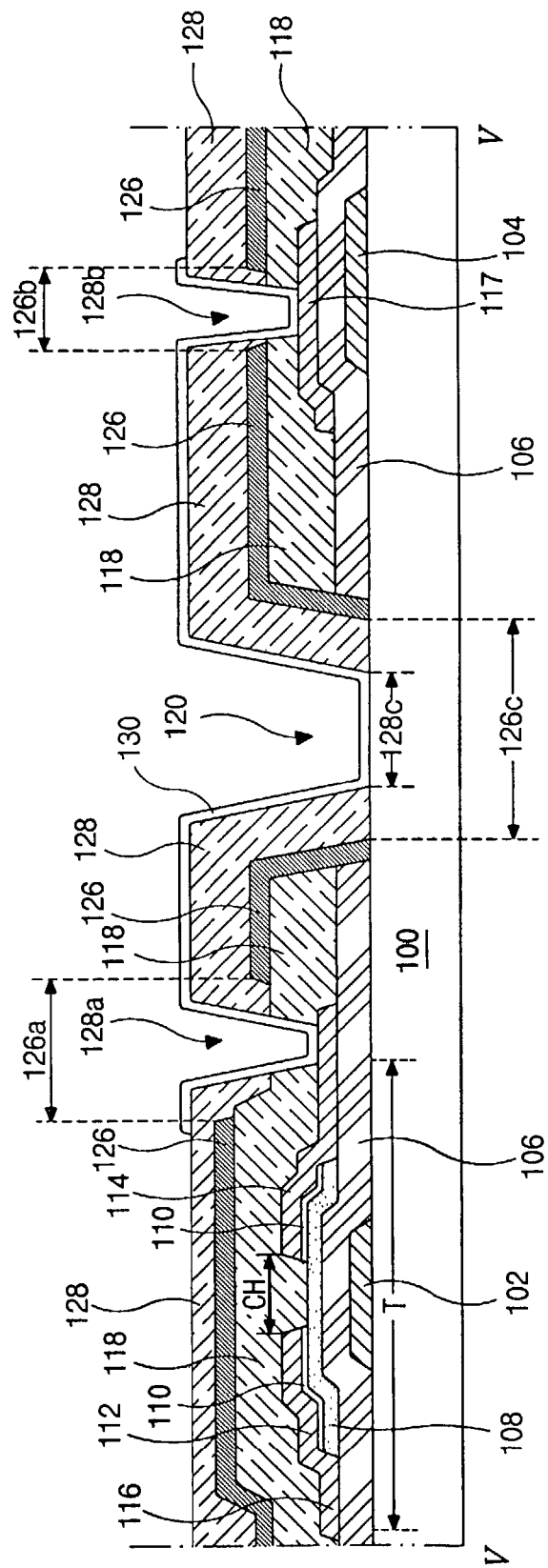
FIG. 5 is a cross-sectional view along the line V—V of FIG. 4.

FIG. 4 is a plan view of an array substrate for a transflective liquid crystal display (LCD) device according to a first embodiment of the present invention, and FIG. 5 is a cross-sectional view along the line V—V of FIG. 4.

In FIGS. 4 and 5, a gate electrode 102 and a gate line 104 are formed on a substrate 100. The gate line 104 extends horizontally in the context of the figure and the gate electrode 102 is connected to the gate line 104. A gate insulator 106 covers the gate electrode 102 and the gate line 104, and an active layer 108 is formed on the gate insulator 106. An ohmic contact layer 110 of doped amorphous silicon is formed on the active layer 108. Next, a source electrode 112 and a drain electrode 114 are formed on the ohmic contact layer 110. The source electrode 112 is connected to a data line 116, which extends vertically in the context of the figure and crosses the gate line 104 to define a pixel region "P". The ohmic contact layer 110 lowers contact resistance between the active layer 108 and the two electrodes 112 and 114. A thin film transistor "T" includes the gate electrode 102, the source electrode 112 and the drain electrode 114. The active layer 108 exposed between the source electrode 112 and the drain electrode 114 becomes a channel "CH" of the thin film transistor "T" when carriers flow between the source electrode 112 and the drain electrode 114.

A first passivation layer 118 covers the source electrode 112, the drain electrode 114, the data line 116 and the capacitor electrode 117. The first passivation layer 118 has a first transmissive hole 120, which exposes a part of the substrate 100 through the gate insulator 106. The first transmissive hole 120 is to equalize the brightness of a transmissive mode with the brightness of a reflective mode and can be formed in only the first passivation layer 118. At this time, the first passivation layer 118 may be made of a benzocyclobutene (BCB) or an acrylic resin. Next, a reflector 126 is formed on the first passivation layer 118. The reflector 126 has a first opening 126a over the drain electrode 114 and a second opening 126b over the capacitor electrode 117. The reflector 126 also has a second transmissive hole 126c corresponding to the first transmissive hole 120. The reflector 126 is made of a metal that reflects light well such as aluminum (Al). Here, the reflector 126 covers the thin film transistor "T". More particularly, the reflector 126 covers entirely the channel "CH" of the thin film transistor "T". Although the reflector 126 is formed on the whole surface of the substrate 100 in the figures, the reflector 126 may be formed in only the pixel region "P" as the related art. A second passivation layer 128 is formed on the reflector 126. The second passivation layer 128 has a first contact hole 128a exposing the drain electrode 114 and a second contact hole 128b exposing a portion of the capacitor electrode 117 through the first passivation layer 118. The first contact hole 128a and the second contact hole 128b go through the first opening 126a and the second opening 126b, respectively. The second passivation layer 128 also has a third transmissive hole 128c corresponding to the first and second transmissive holes 120 and 126c. A transparent electrode 130 is formed on the second passivation layer 128 and the transparent electrode 130 is located in the pixel region "P". The transparent electrode 130 is connected to the drain electrode 114 through the first contact hole 128a and connected to the capacitor electrode 117 through the second contact hole 128b. The transparent electrode 130 is not formed over the thin film transistor "T" and the reflector 126 is disconnected from the transparent electrode 130, so no electric charges are created in the reflector 126.

FIGS. 6A to 6D are cross-sectional views illustrating a method of manufacturing an array substrate for the transflective liquid crystal display (LCD) device according to the present invention, and correspond to cross sections along the line V—V of FIG. 4.

Figure 6A:
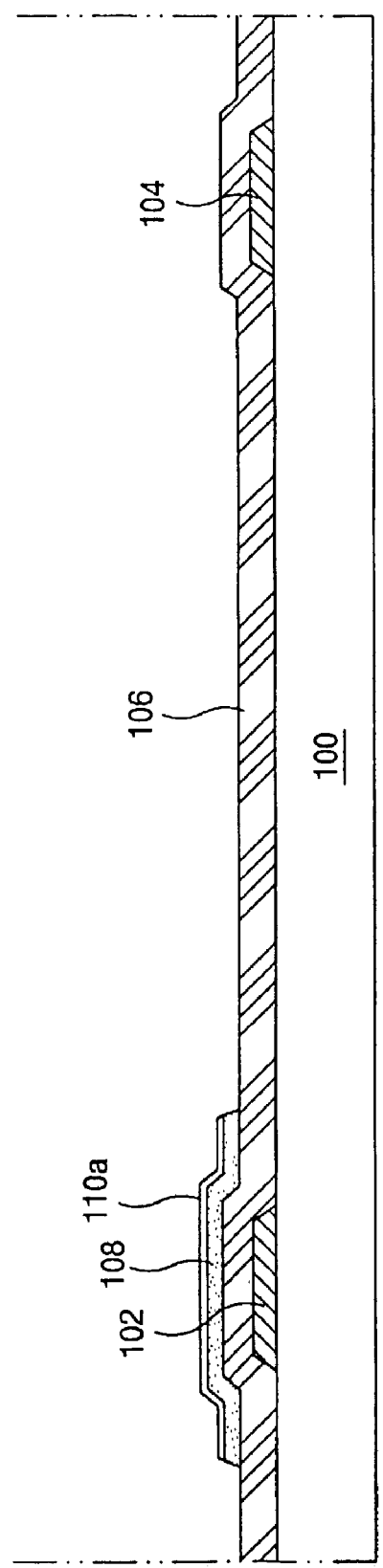
FIGS. 6A to 6D are cross-sectional views illustrating a manufacturing process of an array substrate for the transflective liquid crystal display device according to the present invention.

In FIG. 6A, a gate electrode 102 and a gate line 104 are formed on a substrate 100 and a gate insulator 106 is formed on the gate electrode 102 and the gate line 104. Next, an active layer 108 and a doped semiconductor layer 110a are formed on the gate insulator 106 in order. The substrate 100 is made of an insulating material such as glass. The gate electrode 102 is connected to the gate line 104, which extends horizontally in the context of FIG. 4, and the gate electrode 102 and the gate line 104 are made of a conducting material. The gate electrode 102 and the gate line 104 may be formed in a single layer including a metal such as aluminum (Al), an alloy of aluminum and neodymium (AlNd), tungsten (W), chromium (Cr), and molybdenum (Mo). Also the gate electrode 102 may be formed in a double layer of aluminum (Al) and chromium (Cr), or aluminum (Al) and molybdenum (Mo) so as to supplement the aluminum (Al), which has a low resistivity but is sensitive to chemicals. The gate insulator 106 may be made of silicon nitride (SiNx) or silicon oxide ($SiO_2$) or the like. The active layer 108 and the doped semiconductor layer 110a are formed of amorphous silicon and doped amorphous silicon, respectively.

Figure 6B:
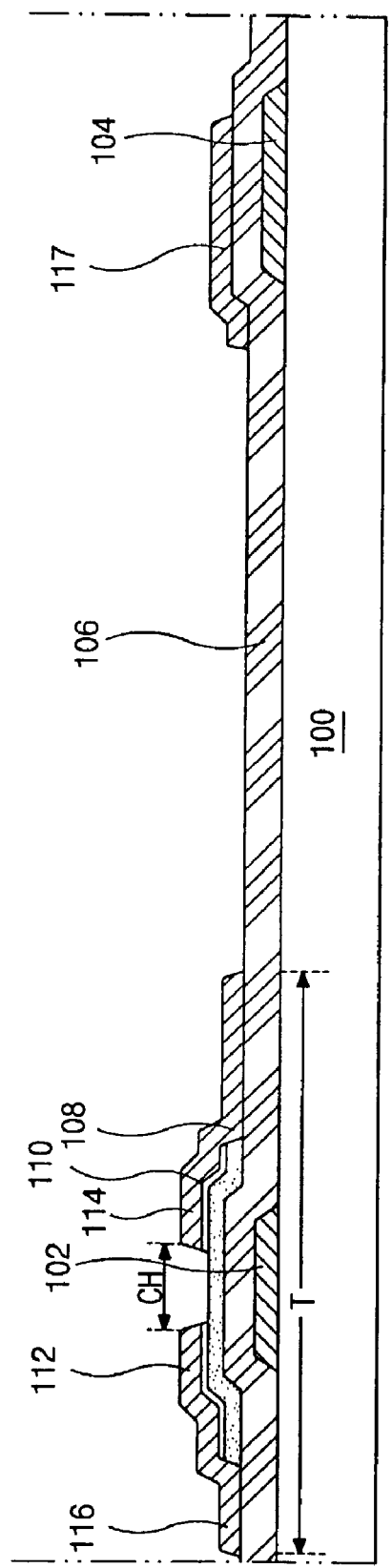

In FIG. 6B, a source electrode 112 and a drain electrode 114 are formed on the doped semiconductor layer 110a of FIG. 6A. A date line 116 and a capacitor electrode 117 are formed in the same layer as the source electrode 112 and the drain electrode 114. Then, the doped semiconductor layer 110, which is exposed between the source electrode 112 and the drain electrode 114, is etched and an ohmic contact layer 110 is completed. The source electrode 112 is connected to the data line 116, which extends vertically in the context of FIG. 4 and crosses the gate line 104 to define a pixel region "P". The capacitor electrode 117 overlaps a part of the gate line 104 to form a storage capacitor. The source electrode 112, the drain electrode 114, the data line 116 and the capacitor electrode 117 may be made of the same material as the gate electrode 102. Here, a thin film transistor "T" includes the gate electrode 102, the source electrode 112 and the drain electrode 114. The active layer 108 exposed between the source electrode 112 and the drain electrode 114 becomes a channel "CH" of the thin film transistor "T" when carriers flow between the source electrode 112 and the drain electrode 114.

Figure 6C:
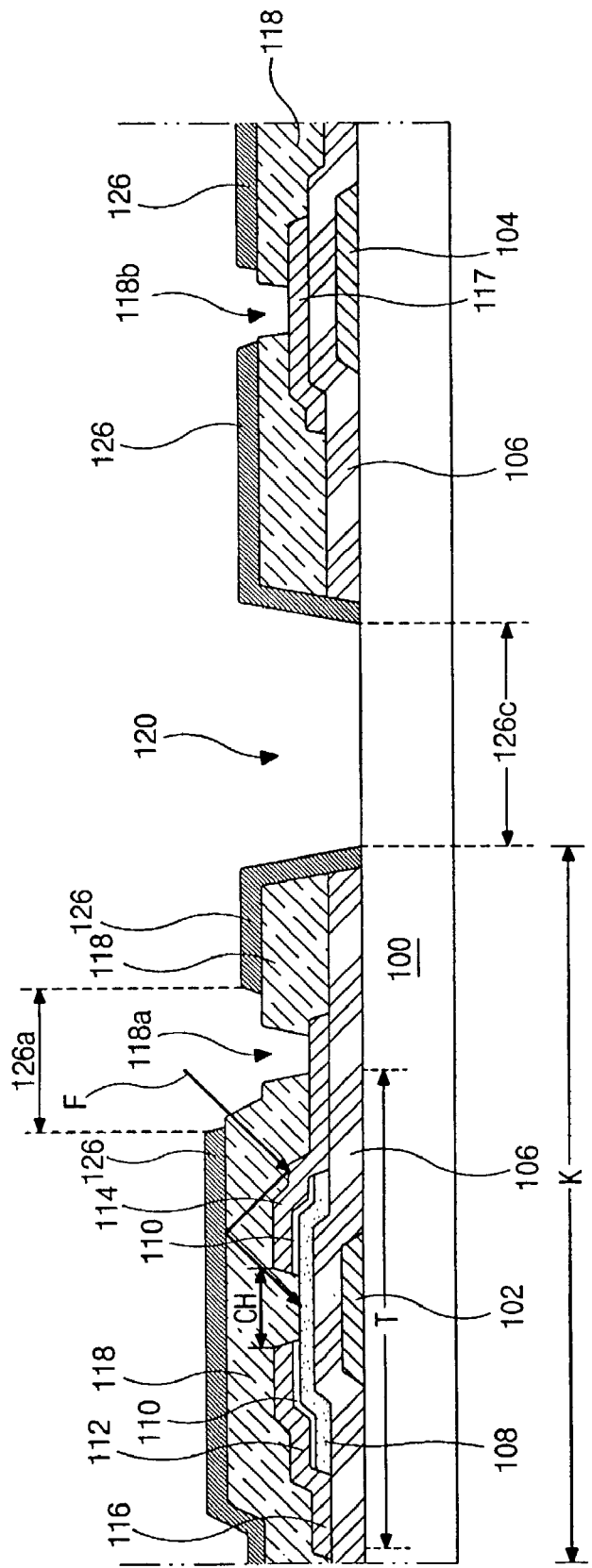

Next, in FIG. 6C, a first passivation layer 118 is formed on the source electrode 112, the drain electrode 114, the data line 116 and the capacitor electrode 117. A reflector 126 is formed on the first passivation layer 118. The first passivation layer 118 has a first transmissive hole 120, which exposes a part of the substrate 100, through the gate insulator 106. The first transmissive hole 120 makes a thickness of a liquid crystal layer in a transmissive region thicker than that of a liquid crystal layer in a reflective region, and so equalizes the brightness of a transmissive mode with the brightness of a reflective mode. The first passivation layer 118 also includes holes 118a and 118b exposing the drain electrode 114 and the capacitor electrode 117, respectively. The first passivation layer 118 is made of one of an organic material, such as benzocyclobutene (BCB) and acrylic resin, and an inorganic material, such as silicon nitride (SiNx) and silicon oxide ($SiO_2$). The first passivation layer 118 may have a refractive index of about 1.5. The reflector 126 has first and second openings 126a and 126b over the drain electrode 114 and the capacitor electrode 117, i.e. corresponding to the holes 118a and 118b, respectively. The first and second openings 126a 126b prevent the reflector 126 from contacting a transparent electrode, a pixel electrode, to be formed later. The reflector 126 also has a second transmissive hole 126c corresponding to the first transmissive hole 120. The reflector 126 is made of a metal that reflects light well, such as aluminum (Al). The reflector 126 may be formed of either aluminum (Al) or an alloy of aluminum and neodymium (AlNd). As stated above, the reflector 126 may be formed on the whole surface of the substrate 100 or formed in only the pixel region "P". Here, the reflector 126 covers the thin film transistor "T". More particularly, the reflector 126 covers entirely the channel "CH" of the thin film transistor "T" to prevent light from going in the channel "CH".

However, as shown in the figure, incident light "F" onto the drain electrode 114, wherein the incident light "F" passes through an inclined surface 119 of the first passivation layer 118 through the first opening 126a, is reflected subsequently at the drain electrode 114 and the reflector 126. Then, the incident light reaches the channel "CH" of the thin film transistor "T" and generates leakage current. By the way, intensity of the incident light decreases after reflecting. An amount by which the intensity of the incident light is reduced depends on a material of a reflecting layer. For example, when the reflecting layer is made of molybdenum (Mo), only about 20 percent of the incident light is reflected. On the other hand, when the reflecting layer is made of chromium (Cr), only about 50 percent of the incident light is reflected. Therefore, if incident light is reflected twice at the drain electrode 114 that is made of molybdenum (Mo), light going in the channel "CH" becomes smaller than about 4 percent of the incident light, and if incident light is reflected twice at the drain electrode 114 that is made of chromium (Cr), light going in the channel "CH" becomes smaller than about 20 percent of the incident light. That is, there is very little light that reaches the channel "CH" if the channel "CH" is spaced apart from the first opening 126a by a distance that incident light onto the drain electrode 114 is reflected at least twice at the drain electrode 114.

Figure 7:
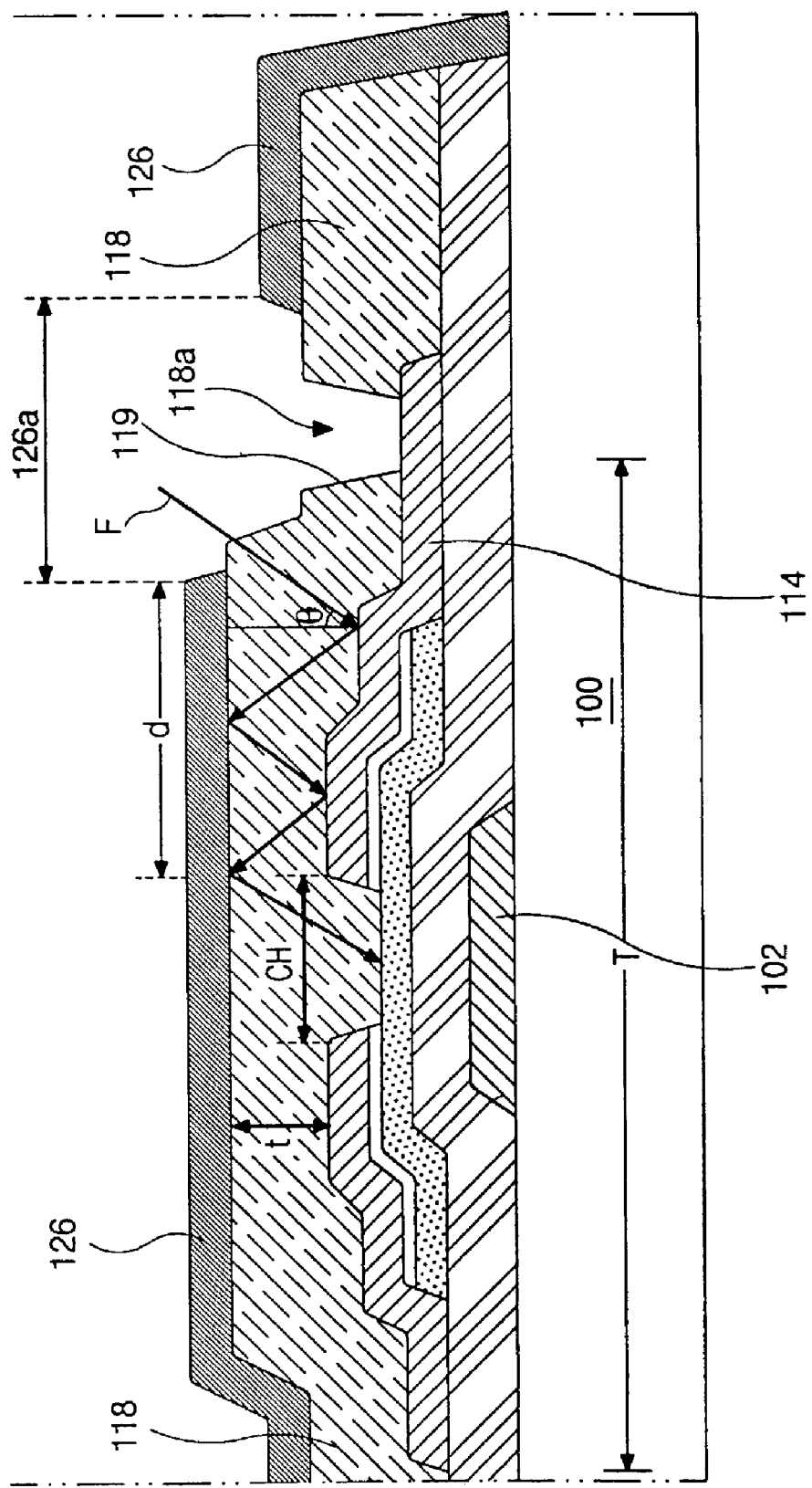
FIG. 7 is an enlarged cross-sectional view illustrating the region "K" of FIG. 6C.

The distance between the channel "CH" and the first opening 126a will be found with reference to FIG. 7. FIG. 7 is a cross-sectional view of magnifying the region "K" of FIG. 6C. In the FIG. 7, incident light onto the drain electrode 114 through the first opening 126a is reflected subsequently at the drain electrode 114 and the reflector 126 twice each. Referring to FIG. 7, the incident light "F" is at an angle of "θ" with respect to a line normal to the surface of the drain electrode 114, and the first passivation layer 118 has an average thickness of "t". The distance "d" between the channel "CH" and the first opening 126a should be more than 3t(tan θ) in order to reflect incident light onto the drain electrode 114 twice. The maximum value of the angle "θ" is about 42 degrees due to refractive indices of other layers and positions of light blocking layers such as a black matrix (not shown) and reflector 126.

Therefore, as light incident upon the channel "CH" is blocked, leakage current is not generated in the thin film transistor "T" and the thin film transistor "T" operates normally.

Figure 6D:
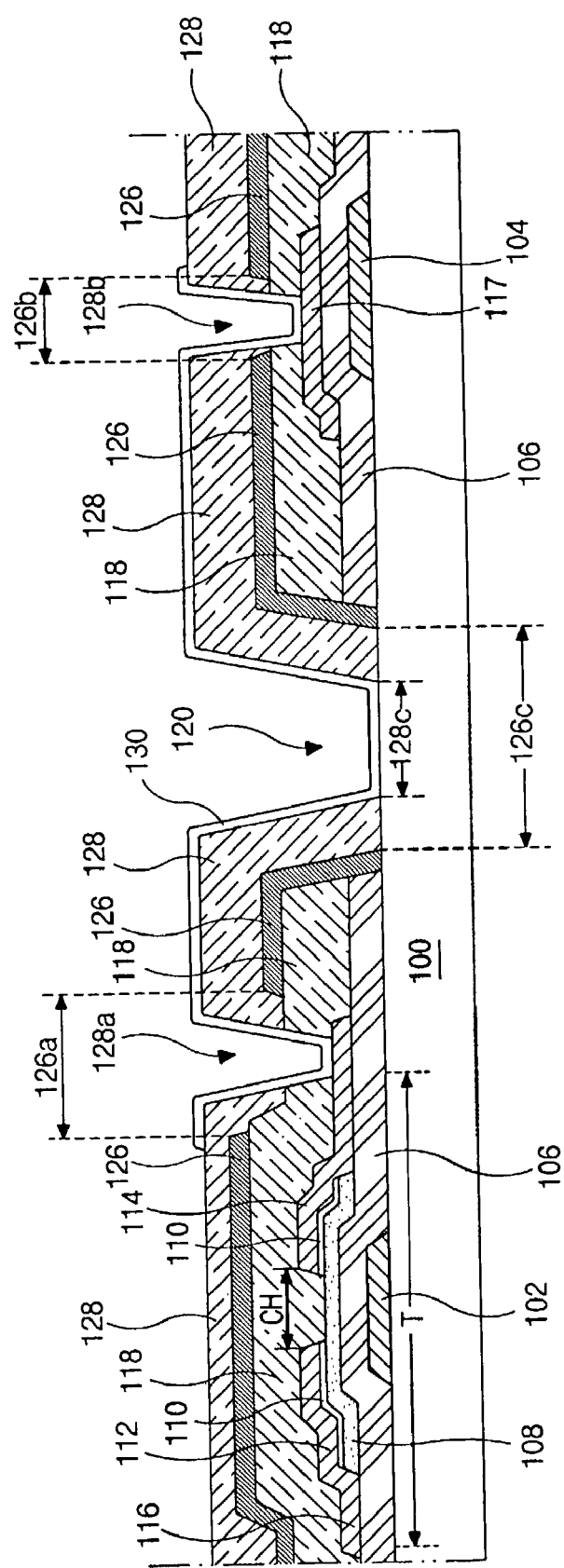

Next, in FIG. 6D, a second passivation layer 128 is formed on the reflector 126 and a transparent electrode 130 is formed on the second passivation layer 128. The second passivation layer 128 has a first contact hole 128a and a second contact hole 128b exposing the drain electrode 114 and the capacitor electrode 117, respectively. The first and second contact holes 128a and 128b go through the first and second openings 126a and 126b, respectively. The contact holes 118a and 118b of FIG. 6C of first passivation layer 118 and the contact holes 128a and 128b can be formed at a time when the second passivation layer 128 is formed. The second passivation layer also has a third transmissive hole 128c corresponding to the first and second transmissive hole 126c. The second passivation layer 128 is made of one of silicon nitride (SiNx) and silicon oxide ($SiO_2$). The transparent electrode 130 is connected to the drain electrode 114 through the first contact hole 128a and connected to the capacitor electrode 117 through the second contact hole 128b. The transparent electrode 130 is made of a transparent conducting material such as an indium-tin-oxide (ITO) and an indium-zinc-oxide (IZO). Here, the reflector 126 is isolated from the transparent electrode 130.

Figure 8:
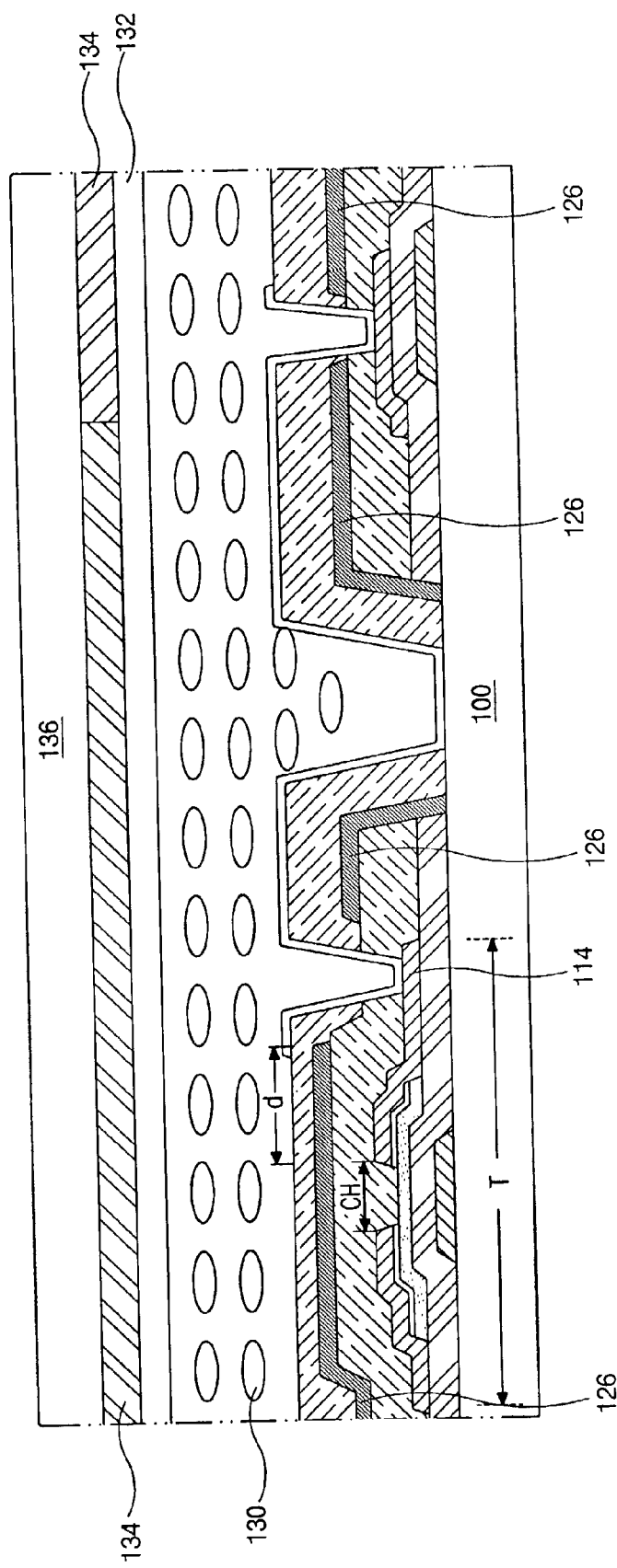
FIG. 8 is a cross-sectional view of a transflective liquid crystal display device according to a first embodiment of the present invention.

FIG. 8 is a cross-sectional view of a transflective liquid crystal display (LCD) device according to a first embodiment of the present invention. In FIG. 8, the transflective LCD device includes an array substrate of FIG. 4. A transparent substrate 136 is arranged spaced apart from the array substrate. A color filter 134 is formed on an inner surface of the transparent substrate 136, and a common electrode 132 is formed on the color filter 134. A liquid crystal layer 140 is disposed between the array substrate and the common electrode 132. The transflective LCD device does not include a black matrix on the inner surface of the transparent substrate 136, and thus the aperture ratio of the transflective LCD device increases.

Figure 9:
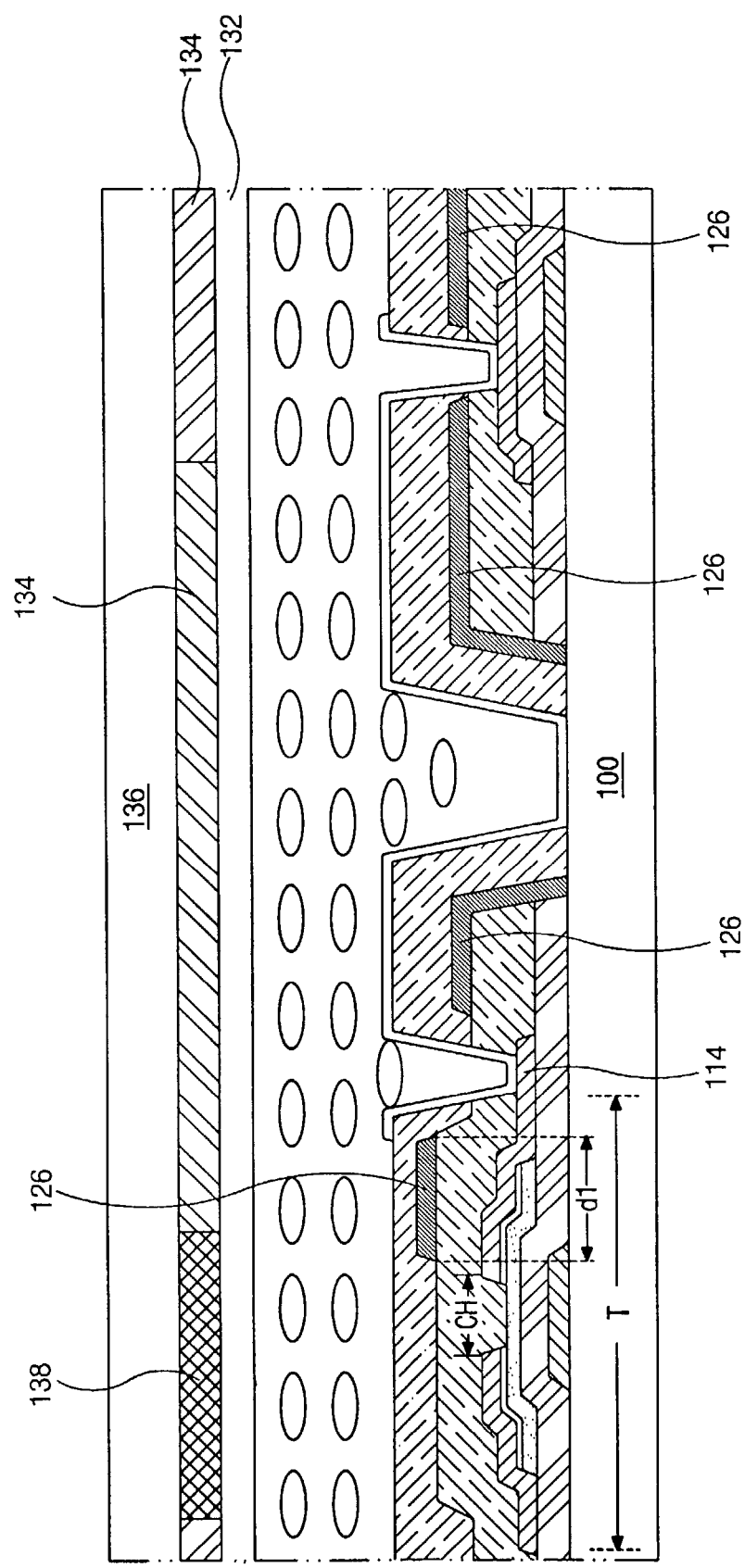
FIG. 9 is a cross-sectional view of a transflective liquid crystal display device according to a second embodiment of the present invention.

FIG. 9 shows a cross-section of a transflective liquid crystal display (LCD) device according to a second embodiment of the present invention. In FIG. 9, an array substrate has the same structure as the array substrate of the first embodiment except for a reflector 126. The reflector 126 of the second embodiment does not cover a channel "CH" of a thin film transistor "T". At this time, the transflective LCD device includes a black matrix 138 on an inner surface of a transparent substrate 136, which is arranged spaced apart from the array substrate. The black matrix 138 overlaps the thin film transistor "T". Here, a length "d1" of the reflector 126 overlapping a drain electrode of the thin film transistor "T" should be long enough for light incident onto the drain electrode 114 to be reflected at least twice at the drain electrode 114.

Figure 10:
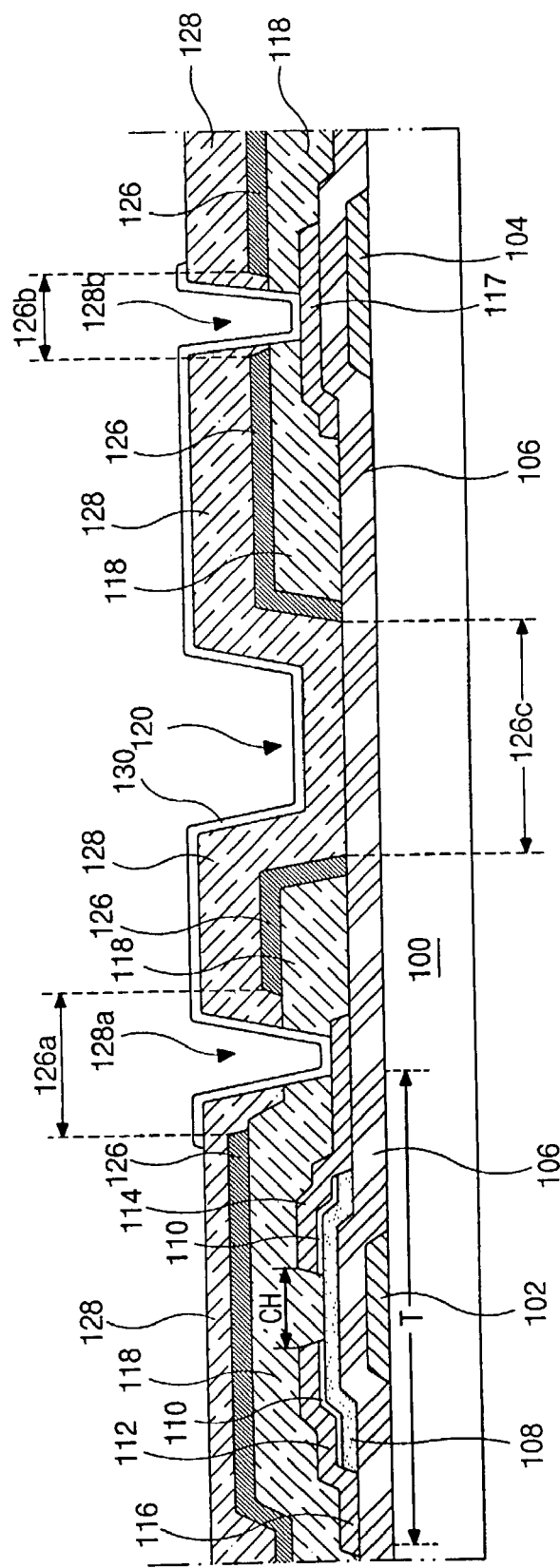
FIG. 10 is a cross-sectional view of an array substrate for a transflective liquid crystal display device according to a third embodiment of the present invention.

FIG. 10 illustrates a cross-section of an array substrate for a transflective liquid crystal display device to a third embodiment of the present invention. In the third embodiment of the present invention, as shown in FIG. 10, it is possible to form a first transmissive hole 120 in only a first passivation layer 118. A second passivation layer 128 does not have a transmissive hole. In other words, a gate insulating layer 106 and the second passivation layer 128 are between a transparent electrode 130 and a substrate 100, so the transparent electrode 130 does not contact the surface of the substrate 100.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A transflective array substrate for a liquid crystal display device, comprising:
    a substrate;
    a thin film transistor on the substrate, the thin film transistor including a gate electrode, a source electrode, a drain electrode, and an active layer, wherein the gate electrode is disposed between the active layer and the substrate, and wherein the thin film transistor includes a channel;
    a first passivation layer on the thin film transistor having a refractive index and an average thickness;
    a reflector on the first passivation layer, the reflector covering the channel and a portion of a pixel region, and the reflector having a reflectivity;
    a second passivation layer on the reflector; and
    a transparent electrode on the second passivation layer, the transparent electrode contacting the drain electrode of the thin film transistor,
    wherein the reflector has an opening over the drain electrode, the opening having a distance from the channel, the distance selected based on the refractive index, the average thickness, and the reflectivity, and the distance selected such that light incident on the opening is reflected off the drain electrode at least twice before reaching the channel, and wherein the reflector corresponds to the transparent electrode.

2. The array substrate according to claim 1, wherein the distance is selected such that it is larger than $3t(\tan\theta)$, wherein t is the average thickness and θ is a maximum angle between the incident light and a line normal to the surface of the drain electrode.

3. The array substrate according to claim 1, wherein the first passivation layer and the reflector have transmissive holes therein, respectively.

4. The array substrate according to claim 1, wherein the reflector is electrically isolated from the transparent electrode.

5. The array substrate according to claim 1, wherein the reflector includes one of aluminum and an alloy of aluminum and neodymium.

6. The array substrate according to claim 1, wherein the first passivation layer includes one of benzocyclobutene (BCB) and acrylic resin.

7. The array substrate according to claim 1, wherein the refractive index is about 1.5.

8. The array substrate according to claim 1, further comprising a gate insulating layer on the substrate.

9. The array substrate according to claim 1, wherein the second passivation layer includes an inorganic material.

10. The array substrate according to claim 1, wherein the light is reflected between an upper surface of the drain electrode and a lower surface of the reflector.

11. The array substrate according to claim 1, further comprising a gate line and a data line, the gate line and the data line crossing each other and being electrically connected to the thin film transistor.

12. The array substrate according to claim 11, further comprising a capacitor electrode over the gate line.

13. The array substrate according to claim 12, wherein the capacitor electrode is connected to the transparent electrode.

14. A transflective liquid crystal display device, comprising:
    first and second substrates facing and spaced apart from each other;
    a thin film transistor on an inner surface of the first substrate, the thin film transistor including a gate electrode, a source electrode, a drain electrode, and an active layer, wherein the gate electrode is disposed between the active layer and the first substrate, and wherein the thin film transistor includes a channel;
    a first passivation layer on the thin film transistor having a refractive index and an average thickness;

a reflector on the first passivation layer, the reflector covering the channel and a portion of a pixel region the reflector having a reflectivity;

a second passivation layer on the reflector;

a transparent electrode on the second passivation layer, the transparent electrode contacting the drain electrode of the thin film transistor;

a color filter on an inner surface of the second substrate;

a common electrode on the color filter; and a liquid crystal layer between the transparent electrode and the common electrode, wherein the reflector has an opening over the drain electrode, the opening having a distance from the channel, the distance selected based on the refractive index, the average thickness, and the reflectivity, and the distance selected such that light incident on the opening is reflected off the drain electrode at least twice before reaching the channel, and wherein the reflector corresponds to the transparent electrode.

15. The liquid crystal display device of claim 14, wherein the light is reflected between an upper surface of the drain electrode and a lower surface of the reflector.

16. The method according to claim 15, wherein the reflector includes one of aluminum and an alloy of aluminum and neodymium.

17. The method according to claim 15, wherein the first passivation layer includes benzocyclobutene (BCB).

18. The method according to claim 15, wherein the first passivation layer includes acrylic resin.

19. A transflective liquid crystal display device, comprising:

first and second substrates facing and spaced apart from each other;

a thin film transistor on an inner surface of the first substrate, the thin film transistor including a gate electrode, a source electrode, a drain electrode, and an active layer, wherein the gate electrode is disposed between the active layer and the first substrate, and wherein the thin film transistor includes a channel;

a first passivation layer on the thin film transistor having a refractive index and an average thickness;

a reflector on the first passivation layer, the reflector overlapping the drain electrode and a portion of a pixel region, the reflector having a reflectivity;

a second passivation layer on the reflector;

a transparent electrode on the second passivation layer, the transparent electrode contacting the drain electrode of the thin film transistor;

a color filter on an inner surface of the second substrate;

a black matrix on an inner surface of the second substrate, the black matrix overlapping the thin film transistor;

a common electrode on the color filter and the black matrix; and a liquid crystal layer between the transparent electrode and the common electrode, wherein the reflector has an opening over the drain electrode, the opening having a distance from the channel, the distance selected based on the refractive index, the average thickness, and the reflectivity, and the distance selected such that light incident on the opening is reflected off the drain electrode at least twice before reaching the channel, and wherein the reflector corresponds to the transparent electrode.

20. The liquid crystal display device of claim 19, wherein the light is reflected between an upper surface of the drain electrode and a lower surface of the reflector.

21. A method of manufacturing a transflective array substrate for a liquid crystal display device, comprising:

forming a gate line and a gate electrode on a substrate;

forming a gate insulator on the gate line and the gate electrode;

forming an active layer on the gate insulator;

forming an ohmic contact layer on the active layer;

forming a data line, a source electrode, and a drain electrode on the ohmic contact layer, the active layer between the source and drain electrodes forming a channel;

forming a first passivation layer on the data line, the source electrode, and the drain electrode, the first passivation layer having a refractive index and an average thickness;

forming a reflector on the first passivation layer, the reflector covering the active layer and a portion of a pixel region and having an opening over the drain electrode, the reflector having a reflectivity, the opening having a distance from the channel, the distance selected based on the refractive index, the average thickness, and the reflectivity, the distance also selected such that light incident on the opening is reflected off the drain electrode at least twice before reaching the channel;

forming a second passivation layer on the reflector; and forming a transparent electrode on the second passivation layer, the transparent electrode contacting the drain electrode, wherein the reflector corresponds to the transparent electrode.

22. The method according to claim 21, wherein the distance is selected such that it is larger than $3t(\tan \theta)$, wherein t is the average thickness and $\theta$ is a maximum angle between the incident light and a line normal to the surface of the drain electrode.

23. The method according to claim 21, wherein the first passivation layer and the reflector have transmissive holes therein, respectively.

24. The method according to claim 21, wherein the reflector is electrically isolated from the transparent electrode.

* * * * *